United States Patent [19]

Alexander et al.

[11] 3,940,600
[45] Feb. 24, 1976

[54] METHOD AND APPARATUS FOR ON-LINE NON-INTERACTIVE BLENDING USING AN UNCOUPLING MATRIX

[75] Inventors: Michael Richard Alexander; Edward Duncan; Kenneth McClements; John Roger Spencer, all of London, England

[73] Assignee: The British Petroleum Company Limited, London, England

[22] Filed: Mar. 26, 1974

[21] Appl. No.: 454,925

[30] Foreign Application Priority Data
Apr. 4, 1973   United Kingdom............... 16057/73

[52] U.S. Cl. .... 235/151.12; 235/150.1; 235/151.34
[51] Int. Cl.² ................. G06F 15/46; G06G 7/58
[58] Field of Search....... 235/151.12, 150.1, 151.34, 235/151.35; 259/154; 137/88, 98, 101.19; 444/1

[56] References Cited
UNITED STATES PATENTS

| | | |
|---|---|---|
| 3,294,859 | 12/1966 | Prater et al. ............ 235/151.12 UX |
| 3,473,008 | 10/1969 | Bay et al. ........................ 235/151.12 |
| 3,590,227 | 6/1971 | Porter et al. .................... 235/151.12 |
| 3,751,644 | 8/1973 | Mayer............................ 235/151.12 |
| 3,826,904 | 7/1974 | Leonard et al. ........... 235/151.12 X |

Primary Examiner—Joseph F. Ruggiero
Attorney, Agent, or Firm—Morgan, Finnegan, Pine, Foley & Lee

[57] ABSTRACT

Method and apparatus for blending, particularly liquid e.g. petroleum products. A number of qualities of the blended product are monitored, on line, to produce electrical signals representative of the respective qualities. The signals are operated on in a computer with a matrix which is an inversion of a matrix representative of the linear property indices of components of the blend to produce output control signals. The output control signals are fed to valves controlling the flow of components of the blend so as simultaneously to control the flow of all components to correct for any deviation of qualities without causing further deviations of other qualities of the blended product.

12 Claims, 3 Drawing Figures

METHOD AND APPARATUS FOR ON-LINE NON-INTERACTIVE BLENDING USING AN UNCOUPLING MATRIX

The invention relates to blending, and more particularly, although not exclusively, to blending petroleum products.

In petroleum product blending the cheapness of any blend is in general constrained by the quality specifications and for any blend there is economic incentive to manufacture a product having certain qualities as close to the specification limit as possible. Traditional blending systems attempt to achieve desired product properties by regulating the components to be in precalculated volumetric ratios to one another. This method is susceptible to certain errors such as imperfection of knowledge of the component properties (e.g. layering in tanks), methods of blend index calculation which are not completely exact and errors in flow metering. Because of these errors it is necessary to leave a margin between the objective and the specification for any blend. The only effective way to reduce this margin is to measure and control the important qualities on line. The control of several qualities on line introduces a problem of which the existence is well known. In general, each of the components affects each of the product qualities, i.e. if one attempts to control a property by varying the proportion of a single component, interactions arise which can lead to an unstable control solution.

United States patent specification No. 3,385,680 discloses a fluid blending system in which qualities of the blended product are monitored, compared with required qualities, and corrections made to the flow rate of a component of the blend. However, in this arrangement corrections made to the flow rate of one component in respect of one required quality causes errors to occur in respect of other required qualities.

U.S. Pat. No. 3,473,008 discloses a feed blending control system which utilises a method of "steepest ascent " to derive outputs to flow controllers. No attempt is made to uncouple these controller outputs and hence interactions arise.

U.S. Pat. No. 3,170,677 discloses a blending system in which qualities of a first trial blend and of correction materials are measured. From these measurements there is determined the required amounts of correction materials to be added to give a required final blend. The system does not provide on line non-interactive blending and no method is disclosed for solving the blend equations.

French Pat. No. 70.19007 discloses a blending system which uses experimentally determined relations between component percentages, and easily measured properties to derive component percentages for a required blend and then controls these derived percentages. No attempt is made to provide non-interactive blending which controls the properties of the blended product.

According to one aspect of the invention a method of blending comprises monitoring a plurality of qualities of a blended product on line, producing a respective electrical signal representative of each of selected qualities or at least representative of each deviation from said selected qualities, feeding said electrical signals to control means, at least operating on said electrical signals, or further signals produced thereby, in the control means with a matrix which is an inversion of a matrix representative of the linear property indices of components of the blend to produce output control signals, and feeding the output control signals, or signals produced thereby to valve means which respectively control the flow of each of the components of the blend so as simultaneously to control the flow of all the components to correct for said deviation without causing further deviations of other qualities of the blended product.

The electrical signals may be operated on serially in a primary control loop by a matrix comprising linearising functions and total flow rate. The output is compared with property desired values to produce error signals which are operated on by a matrix comprising controller algorithms, which matrix is an inversion of the component linear property blending indices matrix, and a further matrix of controller algorithms to produce the output control signals.

The signals derived from the operation of the matrix comprising linearising functions and total flow rate may also be fed to a secondary control loop in which these signals are integrated and operated on by a matrix of inverse linearising transformations to produce signals which are compared with blended product property desired values to produce further error signals which are operated on by a third matrix of controller algorithms, and a further matrix of linearising functions to produce signals which are fed to the primary control loop as said property desired signals.

The controller algorithms of said third matrix may be of the form:

$$\Delta I_s = E \cdot V_1/V_2$$

where $\Delta I_s$ is the correction to the primary control loop property desired signals, $E$ is the difference between the integratad blended product property and the desired value, $V_1$ is the volume of blended product to date, and $V_2$ is the volume remaining to be blended.

The blended product may be a petroleum product and said qualities may be the qualities of any combination of the properties sulphur content, density, flash point, pour point, cloud point, distillation point, octane number, Reid vapour pressure and viscosity.

The control means may be arranged to verify by calculation, correct operation of the monitoring means.

According to a further aspect of the invention a blending apparatus comprises a plurality of monitoring means, each capable of being connected to a blended product line to monitor a selected quality of the blended product and produce an electrical signal indicative of the selected quality or at least indicative of a deviation from the selected quality, control means connected to receive signals from the monitoring means, the control means being arranged to operate on signals derived from said electrical signals with a matrix which is an inversion of a matrix representative of the properties of components of the blended product to produce output control signals, and a plurality of valve means each connected to control the flow of one of the components to the product line, the output control signals being arranged to be fed to control all the valve means simultaneously, so as to control the flow of all the components to correct for any deviations without causing further deviations of other qualities of the blended product.

The control means may include a series primary control loop arranged such that said electrical signals are fed to the input of such loop to be operated on by a matrix comprising linearising functions and total flow rate, the output of which is fed to comparison means to be compared with signals representative of property desired values to produce output error signals therefrom, the output error signals are operated on by a matrix of controller algorithms, the outputs therefrom are operated on by the matrix which is an inversion of the component linear property blending indices matrix and the outputs therefrom are operated on by a further matrix of controller algorithms to produce said output control signals.

There may also be provided a secondary control loop wherein the output from the operation of the matrix comprising linearising functions and total flow rate in the primary control loop are/is connected to integrating means the output of which is connected to means including a matrix of inverse linearising transformations and the output of which is connected to comparison means arranged to be fed with blended product property desired values, the output from the comparison means is connected to means including a third matrix of controller algorithms, the output of which is connected to means including a further matrix of linearising functions and the output of the latter means is connected to the primary control loop to provide said property desired values.

Said means including the third matrix of controller algorithms may be such that the form of the controller algorithms is:

$$\Delta I_e = E \cdot V_1/V_2$$

where $\Delta I_e$ is the correction to the primary control loop property desired signals, $E$ is the difference between the integrated blended product property and the desired value, $V_1$ is the volume of the blended product to date, and $V_2$ is the volume remaining to be blended.

Said monitoring means may comprise any combination of means for monitoring sulphur content, density, flash point, pour point, cloud point, distillation point, octane number, Reid vapour pressure and viscosity.

Said control means may comprise a digital computer with an interface interconnected between the computer and the monitoring and valve means.

The foregoing and further features of the invention may be more readily understood from the following description of a preferred embodiment thereof, by way of example, with reference to the accompanying drawing, in which.

Figure 1:
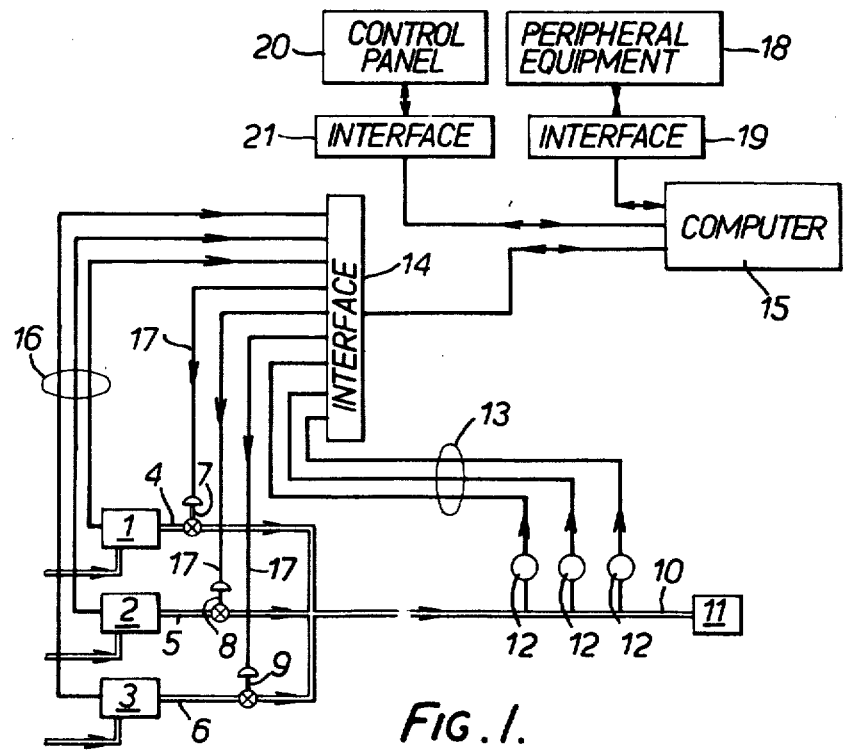
FIG. 1 is a block schematic representation of a blending apparatus having for illustration three components.

Referring now to FIG. 1 the apparatus comprises component flow meters 1, 2 and 3 for measuring flow rates of respective components to be blended. Respective connection pipes 4, 5 and 6 lead via respective flow control valves 7, 8 and 9 to a product pipe 10 and product storage tank 11. The blended product in pipe 10 is monitored by respective monitoring means 12. Signals derived from monitoring means 12 are fed via respective leads 13 to an interface 14 and thence to a computer 15. Signals from flow meters 1, 2 and 3 and temperature transmitters are fed via respective leads 16 and interface 14 to computer 15. Output control signals from computer 15 are fed via interface 14 and respective leads 17 to control the valves 7, 8 and 9. Peripheral equipment 18, such as tape or card readers and printer, are connected via an interface 19 to computer 15. A control panel 20 is connected via an interface 21 to computer 15.

The monitoring means 12 comprise respective analysers or other devices for determining sulphur content, density, flash point, pour point, cloud point, distillation point, octane number, Reid vapour pressure. The monitoring means actually utilised for any particular blend will vary according to required qualities of the blend. The monitoring means may be continous in operation, or discontinuous providing output results periodically. In this latter case suitable sampled data algorithms must be used in the elements of $C_1$. The interface 14 provides suitable isolation between the plant and the computer and provides required analogue to digital and digital to analogue conversions where required.

Figure 2:
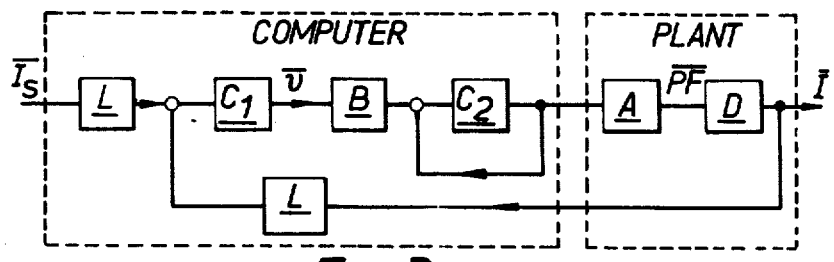
FIG. 2 is a block representation of a basic primary multivariable control loop.

Referring now to FIG. 2 there is shown a basic multivariable control loop representation of the FIG. 1 apparatus and the contents of the various parts are detailed below for a three component blend.

$$C_1 = \begin{vmatrix} C_1 & 0 & 0 \\ 0 & C_2 & 0 \\ 0 & 0 & C_3 \end{vmatrix} \quad \text{WHERE C's are controller algorithms.}$$

$$L = \begin{vmatrix} Fl_1 & (v_1) & 0 \\ 0 & & Fl_2 \\ 0 & & 0 \end{vmatrix} (v_2) \begin{matrix} 0 \\ 0 \\ 1 \end{matrix} \quad \text{WHERE F is total flow } l(v)\text{'s rate are linearising functions.}$$

$$B = A^{-1} = \begin{vmatrix} b_{11} & b_{12} & b_{13} \\ b_{21} & b_{22} & b_{23} \\ b_{31} & b_{32} & b_{33} \end{vmatrix} \quad \text{WHERE b's are elements of the uncoupling matrix.}$$

$$C_2 = \begin{vmatrix} C_4 & 0 & 0 \\ 0 & C_5 & 0 \\ 0 & 0 & C_6 \end{vmatrix} \quad \text{WHERE C's are controller algorithms}$$

$$A = \begin{vmatrix} a_{11} & a_{12} & a_{13} \\ a_{21} & a_{22} & a_{23} \\ a_{31} & a_{32} & a_{33} \end{vmatrix} \quad \text{WHERE a's are component blending indices.}$$

$$D = \begin{vmatrix} \dfrac{L_1^{-1}(P_1)}{F} & 0 & 0 \end{vmatrix} \quad \text{WHERE } L^{-1}(P_1)$$

| | | |
|---|---|---|
| 0 | $\dfrac{L_2^{-1}(P_2)}{F}$ 0 | are inverse |
| 0 | 0  1 | linearising transformations. |

The blending plant can essentially be described by a set of linearised blending equations of the form $$P_1 F = a_{11} f_1 + a_{12} f_2 + a_{13} f_3$$
$$P_2 F = a_{21} f_1 + a_{22} f_2 + a_{23} f_3$$
$$F = f_1 + f_2 + f_3$$

Where the a's are component blending indices and will form the matrix A with $P_1$, $P_2$ being the product blending indices and the f's the component flow rates.

The on line analysers measures product properties such as flash point or pour point some of which do not blend linearly using equations of the type shown above. These product properties must be converted to linearly blending indices using empirically derived relations $L_i^{-1}(P_i)$ which might for example have the form $$P_1 = K_1 \exp(I_1 - K_2)$$

where $K_1$, $K_2$ are constants.

Therefore the mathematical description must include a multiplication of the form: $I = D.PF$ to derive the product properties where the I's are the product properties. In full this is:

$$\begin{vmatrix} \dfrac{L_1^{-1}(P_1)}{F} & 0 & 0 \\ 0 & \dfrac{L_2^{-1}(P_2)}{F} & 0 \\ 0 & 0 & 1 \end{vmatrix} \begin{vmatrix} P_1 F \\ P_2 F \\ F \end{vmatrix} = \begin{vmatrix} I_1 \\ I_2 \\ F \end{vmatrix}$$

The same mathematical description of the plant may also be used in the computer to simulate the plant operation and the outputs of such simulation compared with the actual plant outputs to give an indication of correct or erroneous operation of the various monitoring devices.

The vector of product properties I is linearised in the computer using the matrix L and compared with a vector of desired values which has been similarly linearised thus producing an error vector. The matrix L has elements which are functions of the total flowrate and predetermined blending index-property relationships. This error vector is then operated on by a matrix or quality controllers C1. The resulting vector $\bar{v}$, of control signals, is then operated on by the uncoupling matrix B to give set points for the flow controllers C2, which provide outputs to the flow regulating valves at 7, 8 and 9.

Figure 3:
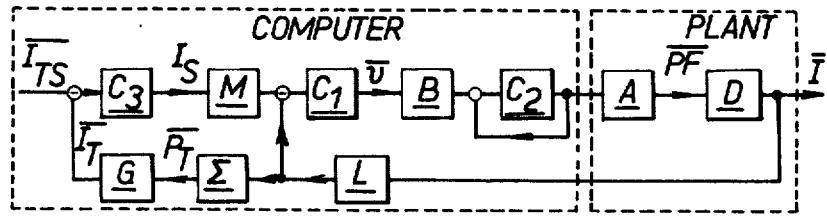
FIG. 3 is a block representation of a primary and secondary multivariable control loop.

FIG. 3 shows a modified system with a secondary control loop including a calculation to give the integrated values of the properties of the material blended to date in combination with a control loop to achieve a desired value of the product properties of the completed product tank.

The vector of product properties $\bar{I}$ is linearised using the matrix L and now, as well as being used in the primary control loop to derive the error signals, the elements of this linearised vector are operated on by a calculation of the form $$P_T = \Sigma PF / \Sigma F$$

to give the integrated values of the linear property indices $P_T$, for each property. This vector is then operated on by a matrix G to give the integrated product properties $\bar{I}_T$ where G is of the form $$\begin{vmatrix} L_1^{-1}(P_1) & 0 & 0 \\ 0 & L_2^{-1}(P_2) & 0 \\ 0 & 0 & 1 \end{vmatrix}$$

This vector is compared with a vector of tank property desired values $I_{TS}$ to produce an error signal which is operated on by matrix of controller algorithms C3. The outputs from these controllers consist of the desired product properties for the primary control loop. These are linearised using the matrix M which has the form $$\begin{vmatrix} L_1(P_1) & 0 & 0 \\ 0 & L_2(P_2) & 0 \\ 0 & 0 & 1 \end{vmatrix}$$

A special algorithm has been developed for use in the elements of C3 which is of the form $$\Delta I_s = E \cdot V_1 / V_2$$

where $\Delta I_s$ is the correction to the inner loop set point $E$ is the difference between the integrated tank property and the desired value $V_1$ is the volume in the tank to date $V_2$ is the volume remaining to blend.

In a quality controlled system where an element of feed forward control is introduced by the uncoupling matrix the computer must know how many components are being used, which lines they are in, the values of their properties and which product properties are to be controlled. Certain data must be entered to the computer before a blend and the computer must organise this data so that the correct control structure exists for each individual blend.

The same number of components as there are lines meters and pumps may be used, or a smaller number of components, still one component to one line. A smaller number of components, but with some components using more than one line may be used.

Each product will have certain properties. A search for an economically optimum blend, done elsewhere may indicate that some of the properties should be controlled at or close to the value of the specification, and/or that the quantities of certain components are restrictive and should be controlled to particular values. In addition to controlling the total flow rate the system can control a sum of such properties or quantities equal to one less than the number of components. The computer must be informed which properties or quantities are to be controlled and must organise the outputs from the quality controllers into a vector suitable for multiplication on the uncoupling matrix.

Data on the values of all the properties of the components must be entered. These will first be linearised to blending indices, using appropriate mathematical expressions. Some elements will be modified by S.G. according to whether weight or volume blending methods are used for those particular properties. We now have a matrix consisting of blending indices for all the properties of all the components, with a particular property referring to a row, and components being referenced by column. Now according to which properties are to be controlled, certain rows of this matrix are taken to form a new square matrix. The remaining property rows must be retained for use in calculation of product properties. The square matrix is inverted and used as the uncoupling matrix. The property matrix originally entered would have a constant number of rows, but a variable number of columns depending on the number of components.

To carry out a blend, the necessary data would be entered to the computer on a punched tape having the form below.

Blend Number: GO M1234
No. of components 3

|  | Tank No. | % | Prop 1 | Prop 2 | Prop 3 | Prop 4 |
|---|---|---|---|---|---|---|
| Set points |  |  | x | 2.6 | 14.7 | x |
| Component 1 | 221 | $r_1$ | $d_{11}$ | $d_{12}$ | $d_{13}$ | $d_{14}$ |
| Component 2 | 122 | $r_2$ | $d_{21}$ | $d_{22}$ | $d_{23}$ | $d_{24}$ |
| Component 3 | 321 | $r_3$ | $d_{31}$ | $d_{32}$ | $d_{33}$ | $d_{34}$ |
| Component 4 |  | x |  |  |  |  |
| Remnant in Product Tank | 721 | 400M$^3$ | $g_1$ | $g_2$ | $g_3$ | $g_4$ |
| Vol. to blend | 5000M$^3$ |  |  |  |  |  | where the
r's are the nominal component percentages
d's are the component properties
g's are the remnant properties It is also possible to retain a bank of component property data in the computer, entering only modifications to this data prior to each blend.

The first row of the property matrix would refer to total flow, i.e. it would consist of 1s and would be written in automatically and not have to be entered for each blend. The size of the property control matrix is defined by the number of set points entered, being this number n plus 1. Where quantities of components are to be controlled this number n will be less than the number of components less 1, and the components whose quantities are to be controlled are entered as the last components.

When the data tape is entered the computer checks the data for order of magnitude, converts properties to indices, inverts the control matrix, tests it for illconditioning and reprints all the data for operator verification. Through a control panel 20 the operator then enters data to indicate to the computer which component is in which line, and whether one component uses two lines. In this latter case the computer divides the component in the ratio of the pump capacities. The operator can then direct all the data to be written to a region of memory reserved for a particular blender, where the information already entered is used to organise the proper control of the blend.

The values of product properties will periodically be calculated using measured flow rates and inserted component properties, and the type of blending equations shown earlier. Facility is provided to substitute this value for the measured product property value in the property controllers. This selection is from the control panel 20.

The organisation of the data to form the uncoupling matrix and regulate the blend is shown diagrammatically below. Assume there are 5 possible components with 8 possible properties, including total flow rate and one component quantity, i.e. 5 possible columns and 8 possible rows. Assume in this case four components are used and properties nos. 1, 3, 4 and 6. Assume that component 1 will be in line 1, component 2 in line 3, component 3 in line 2 and component 4 divided between lines 4 and 5.

|  | Inspection data property matrix | | Matrix of blending indices stored |
|---|---|---|---|
| Enter data | 1 1 1 1 0<br>$d_{21}d_{22}d_{23}d_{24}0$<br>$d_{31}d_{32}d_{33}d_{34}0$<br>$d_{41}d_{42}d_{43}d_{44}0$<br>$d_{51}d_{52}d_{53}d_{54}0$<br>$d_{61}d_{62}d_{63}d_{64}0$<br>$d_{71}d_{72}d_{73}d_{74}0$<br>0 0 0 0 0 | Linearise and modify rows from S.G. data according to whether or not weight blending ⟶ | 1 1 1 1 0<br>$a_{21}a_{22}a_{23}a_{24}0$<br>$a_{31}a_{32}a_{33}a_{34}0$<br>$a_{41}a_{42}a_{43}a_{44}0$<br>$a_{51}a_{52}a_{53}a_{54}0$<br>$a_{61}a_{62}a_{63}a_{64}0$<br>$a_{71}a_{72}a_{73}a_{74}0$<br>0 0 0 0 0 |

|  | Square matrix containing square blending matrix | | Uncoupling matrix is in top left hand corner |
|---|---|---|---|
| Sort according to information on properties to be controlled | 1 1 1 1 0<br>$a_{31}a_{32}a_{33}a_{34}0$<br>$a_{41}a_{42}a_{43}a_{44}0$<br>$a_{61}a_{62}a_{63}a_{64}0$<br>0 0 0 0 0 | ⟶<br><br><br><br>Invert ⟶ | $b_{11}b_{12}b_{13}b_{14}0$<br>$b_{21}b_{22}b_{23}b_{24}0$<br>$b_{31}b_{32}b_{33}b_{34}0$<br>$b_{41}b_{42}b_{43}b_{44}0$<br>0 0 0 0 0 |

Read into 5 × 5 storage space.

The outputs from the property controllers are read into addresses for input to the uncoupling matrix. This part of the system now looks as shown:

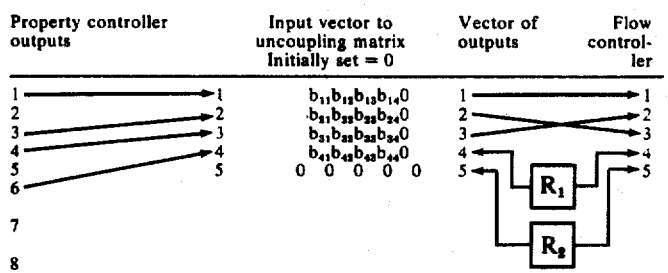

The foregoing illustrates how the multivariable control loop in FIG. 2 is organised for each blend.

Although a single blend has been detailed it will be apparent to those skilled in the art how this method and apparatus can be utilised to provide other blends.

We claim:

1. A method of non-interactive blending, comprising the steps of:
    monitoring a plurality of qualities of a blended product on line;
    producing electrical signals representative of the selected qualities;
    feeding the electrical signals to a control means;
    operating on the electrical signals in the control means with an uncoupling matrix, which is an inversion of a matrix representing linear property indices of components of the blend, to produce output control signals;
    feeding the output control signals to valve means, which respectively control the flow of each of the components of the blend, to simultaneously control the flow of all of the components to correct for any deviation without causing deviations of other qualities of the blended product.

2. The method claimed in claim 1, including the steps of:
    serially operating on the electrical signals in a primary control loop by a matrix including linearising functions and total flow rate;
    comparing the output resulting from the serial operation with property desired values to produce error signals;
    operating on the error signals with a matrix including controller algorithms, the uncoupling matrix, and a further matrix of controller algorithms to produce the output control signals.

3. The method claimed in claim 2, including the steps of:
    feeding the signals derived from the serial operation to a secondary control loop;
    integrating and operating on the signals derived from the serial operation by a matrix of inverse linearising transformations to produce signals;
    comparing the output signals resulting from operation of the matrix of inverse linearising transformations with blended product property desired values to produce further signals;
    operating on the further error signals with a third matrix of controller algorithms and a further matrix including linearising functions and total flow rate to produce signals which are fed to the primary control loop as the property desired signals.

4. The method claimed in claim 3, including the the controller algorithms of said third matrix are of the form:
$$\Delta I_e = E.V_1/V_2$$
where
    $\Delta I_e$ is the correction to the primary control loop property desired signals,
    $E$ is the difference between the integrated blended product property and the desired value,
    $V_1$ is the volume of blended product to date, and
    $V_2$ is the volume remaining to be blended.

5. The method claimed in claim 3 wherein:
    the blended product is a petroleum product;
    the qualities include sulphur content, density, flash point, pour point, cloud point, distillation point, octane number, Reid vapour pressure, and viscosity.

6. The method claimed in claim 3, including the steps of:
    verifying by calculation, the correctness of the monitored qualities.

7. Blending apparatus, comprising:
    a plurality of monitoring means, each of said monitoring means being connected to a blended product line to monitor a selected quality of the blended product and produce an electrical signal indicative of the selected quality;
    control means for receiving signals from said monitoring means, said control means operating on the electrical signals with an uncoupling matrix, which is an inversion of a matrix representing the linear property indices of components of the blended product, to produce output control signals;
    a plurality of valve means each for controlling the flow of one of the components to the blended product line; and
    means for feeding the output control signals to said valve means to control all the valve means simultaneously so as to control the flow of all the components to correct for any deviations without causing further deviations of other qualities of the blended product.

8. The blending apparatus claimed in claim 7, wherein:
    said control means includes a series primary control loop arranged such that the electrical signals are fed to the input of said primary control loop to be operated on by a matrix comprising linearising functions and total flow rate;
    comparison means for comparing the output from said primary control loop with signals representative of property desired values to produce output error signals;
    means for operating on the output error signals with a matrix of controller algorithms;

means for operating on the output error signals resulting from the matrix of controller algorithms with the uncoupling matrix; and means for operating on the signals resulting from the uncoupling matrix with a further matrix of controller algorithms to produce the output control signals.

9. The blending apparatus claimed in claim 8, wherein:

said control means includes a secondary control loop for connecting the output from the operation of the matrix comprising linearising functions and total flow rate in the primary control loop to integrating means, the output of said integrating means being connected to means including a matrix of inverse linearising transformations, comparison means coupled to said inverse matrix means to receive the output thereof and blended product property desired values, said comparison means having its output coupled to means including a third matrix of controller algorithms, said third matrix having its output coupled to means including a further matrix of linearising functions, said further matrix means having its output coupled to the primary control loop to provide the property desired values.

10. The blending apparatus claimed in claim 9, wherein:

said third matrix means has controller algorithms of the form:

$$\Delta I_s = E \cdot V_1 / V_2$$

where $\Delta I_s$ is the correction to the primary control loop property desired signals, $E$ is the difference between the integrated blended product property and the desired value, $V_1$ is the volume of the blended product to date, and $V_2$ is the volume remaining to be blended.

11. The blending apparatus claimed in claim 9, wherein:

said monitoring means includes means for monitoring sulphur content, density, flash point, pour point, distillation point, octane number, Reid vapour pressure, and viscosity.

12. The blending apparatus claimed in claim 9, wherein:

said control means includes a digital computer with an interface between said digital computer and said monitoring means and said valve means.

* * * * *